Dec. 4, 1956 P. W. HAGE 2,772,990
CORN-STARCH PROCESS INVOLVING VORTICAL CLASSIFICATION
Filed Aug. 26, 1952
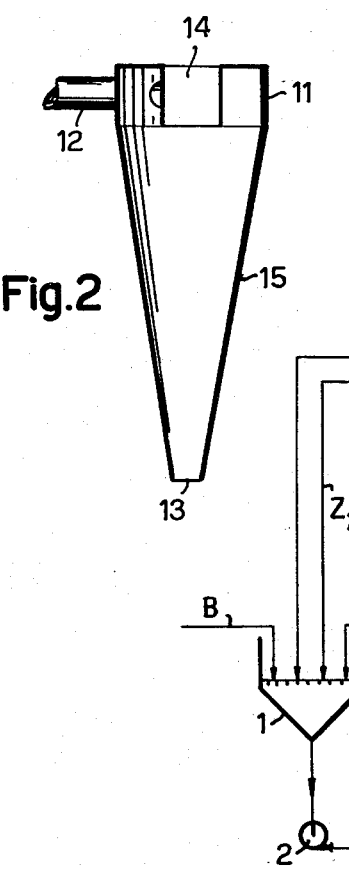
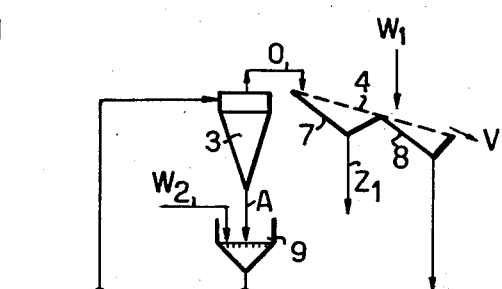
INVENTOR
Pieter Willem Hage
By Cushman, Darby & Cushman
ATTORNEYS

2,772,990

CORN-STARCH PROCESS INVOLVING VORTICAL CLASSIFICATION

Pieter W. Hage, Koog aan de Zaan, Netherlands, assignor to Stamicarbon N. V., Heerlen, Netherlands Application August 26, 1952, Serial No. 306,389

Claims priority, application Netherlands September 5, 1951

2 Claims. (Cl. 127—67)

This invention relates to the manufacture of starch and by-products from corn by the wet method; and in particular it relates to the separation from an intermediate mill starch stream of a fraction of cell-conglomerates which is to be ground to free the starch thereof.

In the manufacture of commercial starch from corn, it has been common practice to treat the corn by successive stages to form what is known as "mill-starch" or a mill starch stream containing fine and coarse slop. This treatment generally includes steeping the corn in vats with water at an elevated temperature, a crushing of the corn kernels and subsequent flotation or screening at about 1 mm. to remove germs and hulls. The resultant mill starch stream consists of starch, bran, gluten and cell-conglomerates, all of which is suspended in the so-called process-water, which consists of water with dissolved chemicals such as sulphur dioxide ($SO_2$) which is added during the first stage of the treatment.

To prepare commercial starch from the mill starch stream it is necessary to separate the starch from the other component parts thereof.

Bran, starch and cell-conglomerates all have a specific gravity of about 1.6; the gluten has a lower specific gravity.

The size of the starch particles ranges from about 10 to 30 microns, the smallest cell conglomerates have a size of about 60 microns, bran is present in a wide size range and the gluten particles are smaller than 100 microns.

A cell-conglomerate consists of composite parts of a corn-kernel and contains starch, bran and gluten. In order to recover the starch therefrom the cell-conglomerates are ground so that the starch is freed; then the starch can be recovered, for instance after uniting the ground product with new mill starch feed.

The common procedure in the above old process is that mill-starch is screened on screens with apertures of approximately 110 microns, but those apertures may also be as large as 200 microns or even larger or as small as 80 microns. The throughfall from those screens consists of process water with starch, gluten, fine bran and fine cell-conglomerates, whereas the oversize from the screens consists of a mixture of coarse bran and cell-conglomerates. As no efficient process for the separation of bran and cell-conglomerates has been available, the mixture thereof is ground. This process has several disadvantages. In the first place the grinding mills are burdened with bran, so that their capacity for cell-conglomerates is reduced and secondly the ground bran gives rise to difficulties in subsequent screening and separating stages.

It is the main object of this invention to provide a process for separating bran and cell-conglomerates and thus to increase the capacity of the grinding mills, screens and separators which treat cell-conglomerates or fractions thereof.

Another drawback of the old process is that it requires a large screening surface for screening cell-conglomerate containing suspension. As cell-conglomerates wear the screens down relentlessly, it is another object of the present invention to reduce screening of suspensions which contain a significant quantity of cell-conglomerates.

According to the invention these and other objects are attained by subjecting a mill starch stream as defined above to vortical classification, making the cut for cell-conglomerates in the range between 100 and 200 microns, thereby separating the mill starch stream into two fractions one of which contains substantially all cell-conglomerates which are coarser than said mesh of separation and a small amount of process water with starch, bran, gluten and fine cell-conglomerates, the other fraction containing the major part of the process water, starch, bran, gluten and fine cell-conglomerates. From the last mentioned fraction starch is recovered by a common treatment for this purpose, which may for instance include screening and separation on starch tables and in centrifuges or in hydrocyclones. Thus the coarse bran is not ground.

The fraction of coarse cell-conglomerates, which according to the invention only contains a small amount of bran, is ground whereby starch is freed and then is recovered. To this end the ground product may be united with new mill starch stream which enters the process. Thus the cell-conglomerates need not be screened.

Before the cell-conglomerate fraction is ground, it may be diluted and subjected to a second vortical classification, so that the amount of free starch which enters the mills is reduced to a minimum. The same object can be attained by screening the cell-conglomerate fraction; in that case only a small screen is required.

Under "vortical classification" is understood classification by means of a vortex. A vortex is established by continuously pressure feeding a liquid or suspension into a closed circular chamber and withdrawing at least a significant part of the liquid or suspension centrally therefrom. For this purpose use is preferably made of a hydrocyclone, but also vortex chambers may be used.

The invention will be explained in more detail with reference to the drawings, wherein:

Figure 1 is a scheme of part of a corn-starch factory and Figure 2 is a sectional view of a hydrocyclone classifier in that factory.

In Figure 1, 1 and 9 represent tanks, 2 and 10 pumps, 3 and 5 each indicate a number of hydrocyclone classifiers arranged in parallel, 4 represents a screen with receivers, 7 and 8 and 6 represent a grinder.

Figure 2 shows a single hydrocyclone comprising a cylindrical section 1, a conical section 15, a tangential feed duct 12, a vortex finder 14 and an apex aperture 13.

A conventional hydrocyclone such as illustrated in Figure 2 comprises a conical section merging into a cylindrical section. The conical section has an outlet or discharge for coarse particles at its apex, while the cylindrical section is located at what would be generally the base of the cone and includes an outlet or discharge for fines. Suspension to be treated is fed to the hydrocyclone tangentially into the cylindrical section which normally has what is called a vortex finder extending from the base and which vortex finder comprises the fines or base discharge. The opening in the apex and in the base are coaxial. Coarse solids are forced by centrifugal force toward the periphery of the conical section from whence the fraction of them discharges from the apex of the cone while the bulk of the liquid with fractionated fines flows axially of the hydrocyclone to discharge through the vortex finder.

A vortex chamber usually is cylindrical and has near one end a central outlet for fines and an outlet at the periphery for coarse particles. Suspension to be treated is fed to the vortex chamber tangentially near the end removed from the discharge outlets.

It should be mentioned, however, that many other forms of hydrocyclones and vortex chambers are also well known; for instance a hydrocyclone may be cylindrical and a vortex chamber may have the shape of a truncated cone.

The size at which a classification is effected depends primarily on the diameter of the hydrocyclone or vortex chamber used for that purpose. With a larger hydrocyclone the cut will be made at a larger size. The classification depends further on the other dimensions of the hydrocyclone or vortex chamber and on the operating conditions, for example infeed pressure. It further will be clear that specifically heavy particles will be separated according to a finer mesh than are specifically light particles and that the mesh of separation also depends upon the shape of the particles to be classified. Bran is for instance separated according to a significantly coarser mesh than are cell-conglomerates.

In the process according to the invention best results are obtained with hydrocyclones of the conventional design. A very efficient separation is for instance effected with the hydrocyclone and under the operating conditions mentioned hereinafter, but it should be understood that satisfactory results can also be obtained with different hydrocyclones and under different operating conditions, and also with vortex chambers. With classifiers of other known types, however, no satisfactory separation of bran and cell-conglomerates can be effected.

In the process according to the invention hydrocyclones 3 and 5 may have the following dimensions:

Diameter of cylindrical section 11_____mm__ 120
Diameter of feed aperture 12_____mm__ 25
Diameter of apex aperture 13_____mm__ 15
Diameter of vortex finder 14_____mm__ 53
Cone angle of conical section 15_____deg__ 20
Height of cylindrical section 11_____mm__ 48
Length of vortex finder 14 inside cylindrical
  section 11_____mm__ 48

The feed pressure with these hydrocyclones should amount to approximately 1 kilogram per square centimeter gauge pressure.

In operation a mill starch stream B, which may have a concentration of 6° Baumé and preferably is free of particles larger than 1 mm. is united with recirculated products and then fed by pump 2 into the hydrocyclones 3. The fraction O discharged from the hydrocyclones 3 through their vortex finders is passed over screen 4, which may have apertures of 130 microns. On the first part of screen 4 this fraction O is drained, the throughfall $Z_1$, consisting of process water starch, gluten, fine bran and fine cell-conglomerates, being received in receiver 7. The oversize consists of coarse bran which is washed with water $W_1$ on the second part of screen 4 to remove adhering starch therefrom; the washed bran V is used in cattle food. The washings are received in receiver 8 and returned to tank 1.

The fraction A leaving the hydrocyclones 3 through the apex apertures consists of a concentrated suspension of cell-conglomerates in mill starch. In tank 9 this fraction is diluted with wash-water $W_2$, which may be a recirculated product, and is then fed by pump 10 to hydrocyclones 5, which correspond with hydrocyclones 3 but which comprise fewer hydrocyclones. The fraction $Z_2$ discharged through the vortex finders of hydrocyclones 5 contains at most a small amount of cell-conglomerates, and is recirculated to tank 1 in view of its starch content. The fraction discharged from the apex apertures of hydrocyclones 5, which may contain about 300 grams of cell-conglomerates per liter and at most a small amount of bran is then ground in grinder 6, whereby starch of the cell-conglomerates is freed. The ground product is returned to tank 1.

I claim:

1. In the wet milling process of manufacturing corn starch wherein a mill stream containing process water, starch, bran, gluten and cell conglomerates is produced, the improvement which comprises the steps of vortically separating said mill stream into two fractions, the first of said fractions containing the bulk of the coarse cell conglomerates exceeding a size within the range of from 100 to 200 microns, and the second of said fractions containing the bulk of the process water, starch, bran, gluten and fine cell conglomerates, grinding said first fraction, recycling the ground first fraction with fresh feed to the vortical separation step, screening said second fraction to remove coarse bran exceeding a size within the range of from 100 to 200 microns therefrom, and then separating the final starch product from said second fraction.

2. In the wet milling process of manufacturing corn starch wherein a mill stream containing process water, starch, bran, gluten and cell conglomerates is produced, the improvement which comprises the steps of vortically separating said mill stream into two fractions, the first of said fractions containing the bulk of the coarse cell conglomerates exceeding a size within the range of from 100 to 200 microns, and the second of said fractions containing the bulk of the process water, starch, bran, gluten and fine cell conglomerates, diluting said first fraction with water, vortically separating said diluted first fraction into third and fourth fractions, said third fraction containing the bulk of the coarse cell conglomerates exceeding a size within the range of from 100 to 200 microns, and said fourth fraction containing the major portion of the process water and freed starch of said first fraction, grinding said third fraction, recycling the ground third fraction with fresh feed to the initial vortical separation step, recycling said fourth fraction with fresh feed to the initial vortical separation step, screening said second fraction to remove coarse bran therefrom, and then separating the final starch product from said second fraction.

References Cited in the file of this patent

UNITED STATES PATENTS

| | | |
|---|---|---|
| 2,013,668 | Peltzer | Sept. 10, 1935 |
| 2,323,077 | Peltzer | June 29, 1943 |
| 2,543,660 | Eckers | Feb. 27, 1951 |
| 2,556,322 | Eckers | June 12, 1951 |
| 2,573,048 | Newkirk | Oct. 30, 1951 |
| 2,689,810 | Vegter | Sept. 21, 1954 |

FOREIGN PATENTS

| | | |
|---|---|---|
| 502,954 | Great Britain | Mar. 23, 1939 |